United States Patent
Fujisawa et al.

Patent Number: 5,401,585
Date of Patent: Mar. 28, 1995

[54] SLIDE SURFACE CONSTRUCTION

[75] Inventors: Yoshikazu Fujisawa; Takahiro Gunji; Masamune Tabata; Kazuhisa Okamoto, all of Saitama, Japan

[73] Assignee: Honda Giken Kogyo Kabushiki Kaisha, Tokyo, Japan

[21] Appl. No.: 164,914

[22] Filed: Dec. 7, 1993

[30] Foreign Application Priority Data

Dec. 7, 1992 [JP] Japan .................. 4-351331

[51] Int. Cl.$^6$ ............................... F16C 33/12
[52] U.S. Cl. ...................... 428/653; 428/615; 428/681; 428/687; 123/193.2
[58] Field of Search .......... 428/615, 653, 656, 660, 428/661, 662, 663, 664, 681, 686, 687; 123/193.2; 277/236, 235 A; 384/912

[56] References Cited

U.S. PATENT DOCUMENTS 4,221,639  9/1980  Ninagawa et al. ........... 123/193.2

FOREIGN PATENT DOCUMENTS 4101386  7/1991  Germany .
2240343  7/1991  United Kingdom .

Primary Examiner—John Zimmerman
Attorney, Agent, or Firm—Lyon & Lyon

[57] ABSTRACT

A slide surface construction is formed of an aggregate of Fe crystals having a body-centered cubic structure. The aggregate includes (3hh0) oriented metal crystals with their (3hh0) planes (by Miller indices) oriented toward a slide surface. The content S of said (3hh0) oriented metal crystals is set in a range represented by $S \geq 40\%$. This makes it possible to provide a slide surface construction which has a predetermined hardness and an excellent wear resistance and ensures that the wearing of a mating member having a lower hardness can be suppressed.

4 Claims, 6 Drawing Sheets (3hh0) plane bcc structure (3hh0) plane bcc structure 5μm

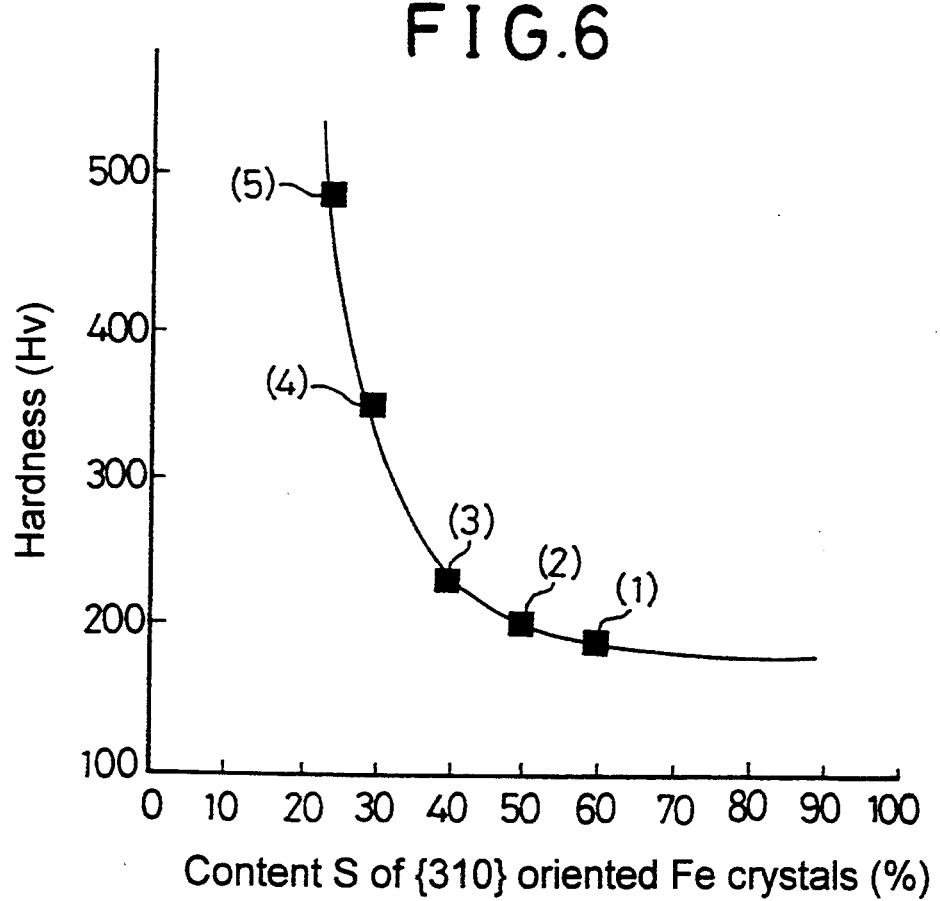

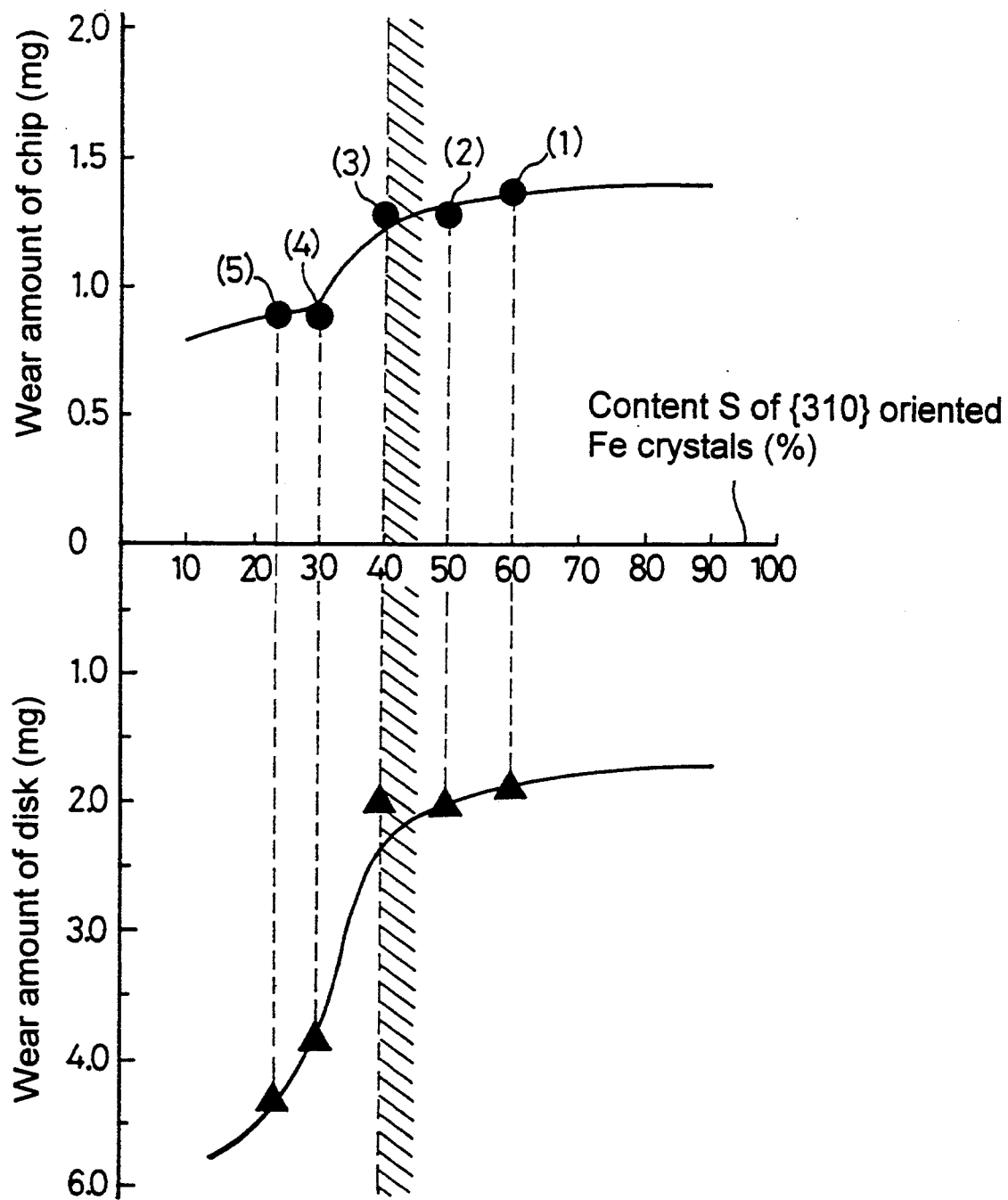

SLIDE SURFACE CONSTRUCTION

BACKGROUND OF THE INVENTION

1. Field of the Invention

The present invention relates to a slide surface construction constituting a slide surface for a mating member.

2. Description of the Prior Art

An example of such conventionally known slide surface construction is an Fe-plate layer which is formed around outer peripheral surfaces of a land portion and a skirt portion of a base material of aluminum alloy in a piston for an internal combustion engine in order to improve the wear resistance of the piston.

If the slide surface construction is formed in the above manner, the resulting piston has an improved wear resistance. However, cylinder sleeves are generally formed from cast iron, if the land and skirt portions slide on the cylinder sleeve under a situation approaching a non-lubricated condition, particularly at the start of the engine, the wearing of the cylinder sleeve may be advanced by the Fe-plated layer having a high hardness.

SUMMARY OF THE INVENTION

It is an object of the present invention to provide a slide surface construction of the type described above, which is provided on a member having a high hardness in contrast with the prior art, e.g., on a cylinder sleeve of cast iron, and which has a good wear resistance even under non-lubrication and ensures that the wearing of the mating member having a lower hardness, e.g., a piston of an aluminum alloy, is suppressed.

To achieve the above object, according to the present invention, there is provided a slide surface construction, which is formed of an aggregate of metal crystals having a body-centered cubic structure, the aggregate including (3hh0) oriented metal crystals with their (3hh0) planes (by Miller indices) oriented toward a slide surface, the content S of the (3hh0) oriented metal crystals being in a range represented by $S \geq 40\%$.

If the (3hh0) oriented metal crystals with their (3hh0) planes (by Miller indices) oriented toward a slide surface are present in the aggregate of the metal crystals having the body-centered cubic structure, the metal crystals forming the slide surface construction are finely divided, and, at the same time, the slide surface morphology is smoothed, and, further, the hardness of the slide surface construction is reduced, all with increasing of the content S.

Thereupon, if the content S is set in a range represented by $S \geq 40\%$, a slide surface construction can be provided, wherein the wear resistance of the slide surface construction itself is good even under non-lubrication, and in relative sliding movement between the slide surface construction and a mating member having a low hardness, for example, approximately one half of the hardness of the slide surface construction, the wearing of the mating member can be suppressed. However, if the content S is less than 40%, the slide surface construction has an increased hardness and hence, under non-lubrication, the amount of slide surface construction itself worn is decreased, but the amount of mating member worn is increased.

The above and other objects, features and advantages of the invention will become apparent from the following description of a preferred embodiment, taken in conjunction with the accompanying drawings.

BRIEF DESCRIPTION OF THE DRAWINGS

FIG. 6 is a graph illustrating the relationship between the content of {310} oriented Fe crystals and the hardness of the slide surface; and FIG. 7 is a graph illustrating results of a wear test.

DESCRIPTION OF THE PREFERRED EMBODIMENT

Figure 1:
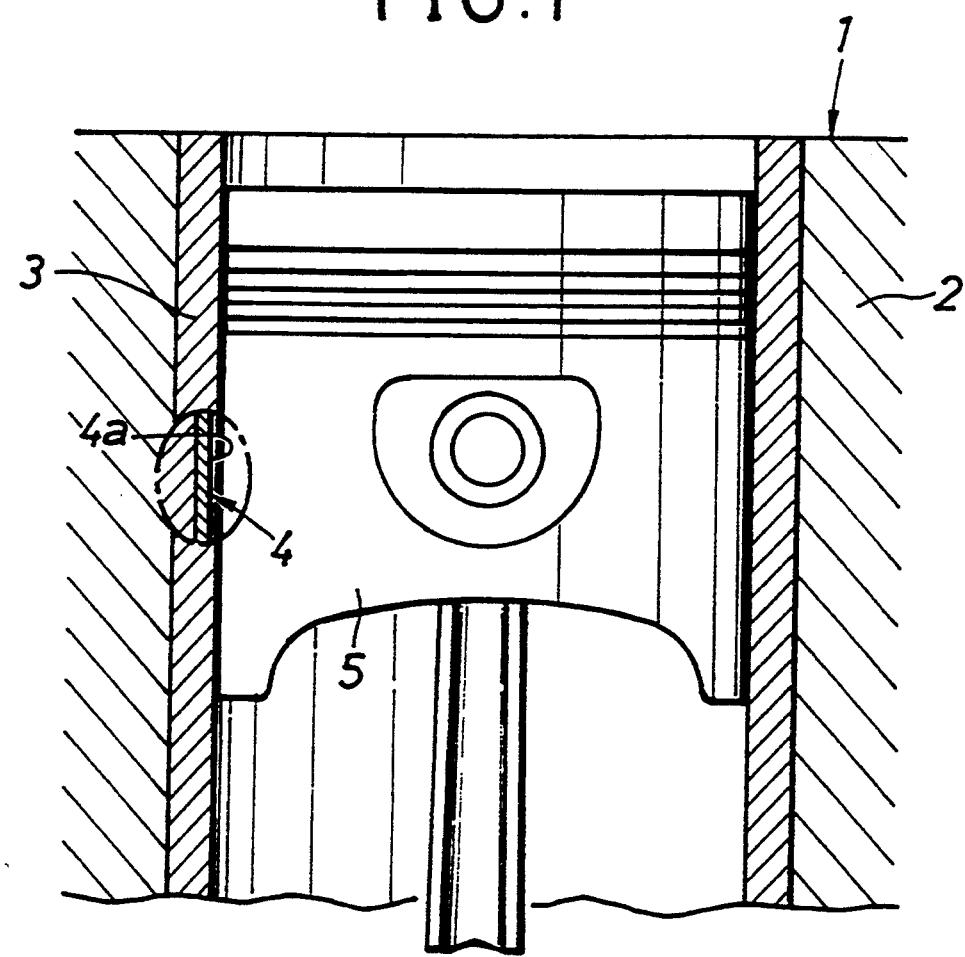
FIG. 1 is a longitudinal sectional side view of an essential portion of a cylinder block provided with a piston.

Referring to FIG. 1, a cylinder block 1 for an internal combustion engine includes a cylinder block body 2 of aluminum alloy and a cylinder sleeve 3 of cast iron. A lamellar slide surface construction 4 is formed by plating on an inner peripheral surface of the cylinder sleeve 3. A piston 5 of aluminum alloy is slidably received in the cylinder sleeve 4.

Figure 2:
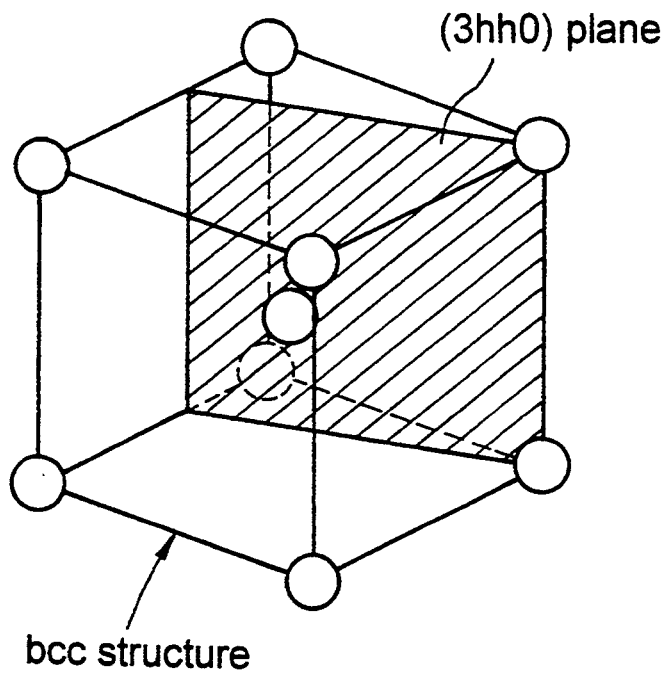
FIG. 2 is a perspective view illustrating a body-centered cubic structure and its (3hh0) plane.

As shown in FIG. 2, the slide surface construction 4 is formed of an aggregate of metal crystals having a body-centered cubic structure (bcc structure). The aggregate includes (3hh0) oriented metal crystals with their (3hh0) planes (by Miller indices) oriented toward a slide surface 4a. The content S of the (3hh0) oriented metal crystals is set in a range represented by $S \geq 40\%$.

If the (3hh0) oriented metal crystals are present in the aggregate of the metal crystals having the body-centered cubic structure, the metal crystals forming the slide surface construction 4 are finely divided and the same time, the slide surface 4a is smoothed and further, the hardness of the slide surface construction 4 including the slide surface 4a is decreased, all with an increase in content S.

Thereupon, if the content S of the (3hh0) oriented metal crystals is set in the above range, a slide surface construction 4 can be provided, wherein the wear resistance of the slide surface construction itself is good even under non-lubrication, and in relative sliding movement between the slide surface construction and a piston 5 having a low hardness, for example, approximately one half of the hardness of the slide surface construction 4, the wearing of the piston 5 can be suppressed. However, if the content S is less than 40%, the slide surface construction 4 has an increased hardness and hence, under non-lubrication, the amount of slide surface construction itself worn is decreased, but the amount of piston 5 worn is increased.

Figure 3:
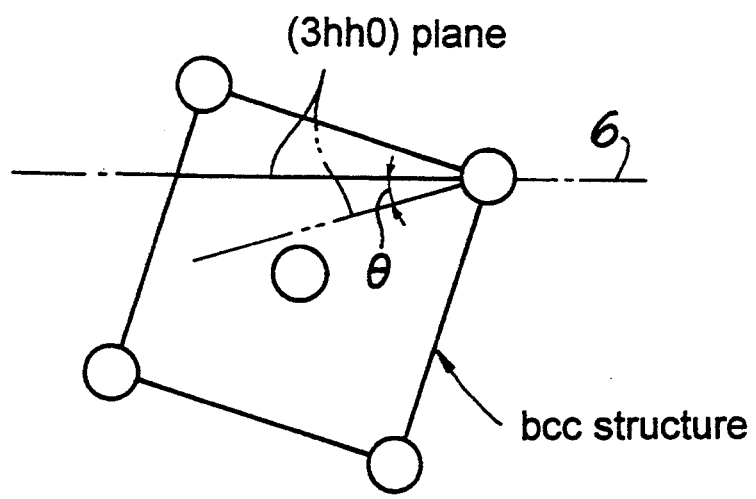
FIG. 3 is a diagram for explaining the inclination of the (3hh0) plane in the body-centered cubic structure.

As shown in FIG. 3, the inclination of the (3hh0) plane with respect to a phantom plane 6 along the slide surface 4a imparts an influence to the hardness of the slide surface construction 4. Thereupon, the inclination angle Θ formed by the (3hh0) plane with respect to the phantom plane 6 is set in a range represented by $0° \leq \Theta \leq 15°$. In this case, the direction of the inclination of the (3hh0) plane is not limited. If the inclination angle is larger than 15%, the hardness of the slide surface construction 4 is too high.

Examples of the metal crystals having the bcc structure are those of simple metals such as Fe, Cr, Mo, W, Ta, Zr, Nb, V, etc., and the alloys thereof.

In the plating treatment for forming the slide surface construction according to the present invention, basic conditions for the electrolytic deposition of the Fe-plating are as shown in Tables 1 and 2.

TABLE 1

| Plating bath composition (g/liter) | | | |
|---|---|---|---|
| Ferrous sulfate | Boric acid | Ammonium sulfate | Organic additive(s) |
| 150~300 | 5~50 | 0~200 | 0~150 |

The organic additives which may be used are urea, saccharin, etc.

TABLE 2

| Treating conditions | | |
|---|---|---|
| Plating bath pH | Plating bath temperature (°C.) | Cathode current density (A/dm$^2$) |
| 1~5 | 10~60 | 0.1~10 |

In the electrolytic deposition of the Fe-plating under the above-described conditions, the precipitation and content of the (3hh0) oriented Fe crystals are controlled by the cathode current density, the pH of a plating bath, the amount of organic additive incorporated and the like.

In addition to electrolytic plating, examples of other plating treatments that may be used includes PVD processes, CVD processes, sputtering processes, ion plating and the like. Conditions for W— or Mo— plating by a sputtering process are, for example, an Ar pressure of 0.2 to 1 pa; an Ar acceleration power of 0.1 to 1.5 kW in direct current; and a base material temperature of 80° to 300° C. Conditions for W-plating by a CVD process are, for example, an WF$_6$ starting material; a gas flow rate of 2 to 15 cc/min.; a pressure of 50 to 300 Pa within the chamber; and a base material temperature of 300° to 600° C.

Particular examples will be described below.

A slide surface construction 4 comprised of an aggregate of Fe crystals were produced by subjecting an inner peripheral surface of a cylinder sleeve 3 of cast iron to an electrolytic Fe-plating process.

Tables 3 and 4 show conditions for the electrolytic Fe-plating process for examples 1 to 5 of the slide surface construction 4.

TABLE 3

| Example No. | Plating bath composition (g/liter) | | | | |
|---|---|---|---|---|---|
| | Ferrous sulfate | Boric acid | Ammonium sulfate | Urea | Saccharin |
| 1 | 197 | 26 | 17 | 0 | 0 |
| 2 | 197 | 26 | 86 | 0 | 0 |
| 3 | 230 | 30 | 100 | 100 | 1 |
| 4 | 230 | 30 | 100 | 100 | 1 |
| 5 | 230 | 30 | 100 | 100 | 1 |

TABLE 4

| Example No. | Treating conditions | | |
|---|---|---|---|
| | Plating bath pH | Plating bath temperature (°C.) | Cathode current density (A/dm$^2$) |
| 1 | 2.8 | 50 | 1 |
| 2 | 2.8 | 50 | 1 |
| 3 | 2.8 | 50 | 8 |
| 4 | 2.8 | 50 | 6 |
| 5 | 2.8 | 50 | 10 |

Table 5 shows the crystal shape of the slide surface 4a, the grain size of the Fe crystals, the content S of the oriented Fe crystals and the hardness for Examples 1 to 5.

TABLE 5

| Example No. | Crystal shape of slide surface | Grain size (μm) | Content S of oriented Fe crystals (%) | | | | | Hardness (Hv) |
|---|---|---|---|---|---|---|---|---|
| | | | (110) | (200) | (211) | (310) | (222) | |
| 1 | Very fine grain Wrinkled | ≦0.5 | 8 | 20 | 9 | 60 | 3 | 190 |
| 2 | Very fine grain Wrinkled | ≦0.5 | 20 | 9 | 21 | 50 | 0 | 200 |
| 3 | Very fine grain | ≦0.5 | 10 | 20 | 20 | 40 | 10 | 230 |
| 4 | Very fine grain SAP* | about 1 | 20 | 20 | 20 | 30 | 10 | 350 |
| 5 | SAP* | about 0.5 | 15 | 21 | 30 | 24 | 10 | 490 |

SAP* = small angular pyramid

Figure 4:
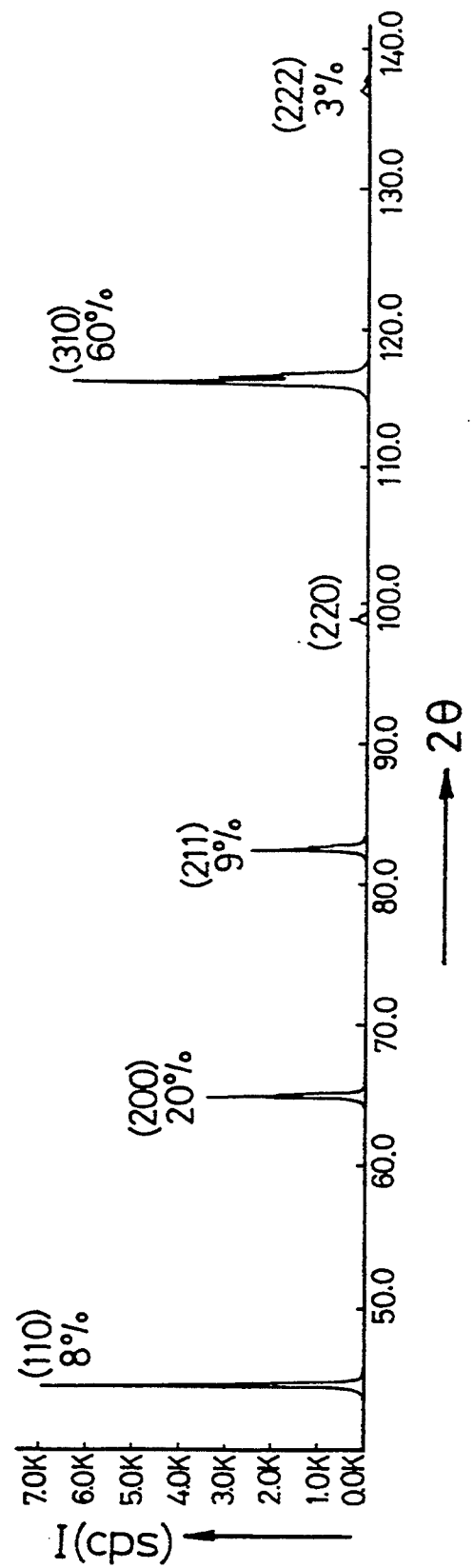
FIG. 4 is an X-ray diffraction pattern for one example of a slide surface construction.

The content S was determined in the following manner on the basis of X-ray diffraction patterns (X-rays were applied in a direction perpendicular to the slide surface 4a) for the examples 1 to 5. Example 1 will be described below. FIG. 4 is an X-ray diffraction pattern for Example 1. The content S of oriented Fe crystals was determined from each of the following expressions. It is to be noted herein that for example, the term "{110} oriented Fe crystal" means an oriented Fe crystals with its {110} plane oriented toward the slide surface 4a.

{110} oriented Fe crystals: $S_{110} = \{(I_{110}/IA_{110})/T\} \times 100$

{200} oriented Fe crystals: $S_{200} = \{(I_{200}/IA_{200})/T\} \times 100$

{211} oriented Fe crystals: $S_{211} = \{(I_{211}/IA_{211})/T\} \times 100$

{310} oriented Fe crystals: $S_{310} = \{(I_{310}/IA_{310})/T\} \times 100$

{222} oriented Fe crystals: $S_{222} = \{(I_{222}/IA_{222})/T\} \times 100$ wherein each of $I_{110}$, $I_{200}$, $I_{211}$, $I_{310}$ and $I_{222}$ is a measurement (cps) of the intensity of X-rays reflected from each crystal plane; each of $IA_{110}$, $IA_{200}$, $IA_{211}$, $IA_{310}$ and $IA_{222}$ is an intensity ratio of X-ray reflected from each crystal plane in an ASTM card. Further, $IA_{110}=100$, $IA_{200}=20$, $IA_{211}=30$, $IA_{310}=12$ and $IA_{222}=6$. Furthermore, $T = (I_{110}/IA_{110}) + (I_{200}/IA_{200}) + (I_{211}/IA_{211}) + (I_{310}/IA_{310}) + (I_{222}/IA_{222})$.

Figure 5:
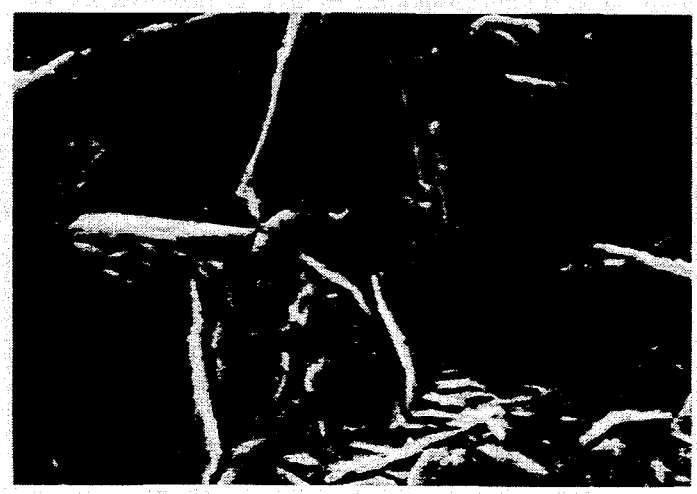
FIG. 5 is a photomicrograph showing the crystal structure of a slide surface in one example of the slide surface construction.

FIG. 5 is a photomicrograph showing the crystal structure of the slide surface 4a in the example 4. In FIG. 5, a smoothed surface produced due to the presence of the {310} oriented Fe crystals with their {310} planes oriented toward the slide surface 4a is observed, and a large number of wrinkles are observed. In this case, the content S of the {310} oriented Fe crystals is equal to 60%, as shown in Table 5 and FIG. 5.

FIG. 6 is a graph taken from Table 5 to illustrate the relationship between the content S of the {310} oriented Fe crystals and the hardness for the examples 1 to 5. In FIG. 6, points (1) to (5) correspond to the examples 1 to 5, respectively. It can be seen from FIG. 6 that the hardness of the slide surface construction 4 is decreased, as the content S of the {310} oriented Fe crystals is increased.

A wear test for the examples 1 to 5 was carried out in a chip-on-disk manner under non-lubrication to determine the relationship between the content S of the (310) oriented Fe crystals and the amounts of wear of the chip and the disk, thereby providing the results shown in Table 6 and FIG. 7. Conditions for the test were as follows: the material of the disk was an Al—10% by weight of Si alloy; the hardness Hv of the disk was 110; the rotational speed of the disk was 0.5 m/sec.; the load was 100N; the slide distance was 1 km; and the area of the slide surface of the chip made from the slide surface construction was 1 cm². The reported wear amount is a decrement (mg) per area (1 cm²) of the disk and chip.

TABLE 6

|  | Wear amount (mg) |
|---|---|
| Example 1) | |
| chip | 1.4 |
| disk | 1.8 |
| Example 2) | |
| chip | 1.3 |
| disk | 2.0 |
| Example 3) | |
| chip | 1.3 |
| disk | 2.0 |
| Example 4) | |
| chip | 0.9 |
| disk | 3.8 |
| Example 5) | |
| chip | 0.9 |
| disk | 4.2 |

FIG. 7 is a graph taken from Table 6, wherein points (1) to (5) correspond to the chips in the examples 1 to 5, respectively. As apparent from Table 6 and FIG. 7, the chips in the examples 1 to 3, with the content of the {310} oriented Fe crystals being in a range represented by S≧40%, were worn in a relatively small amount, and yet they ensured that the amount of wear experienced by the disk as the mating member was suppressed significantly, as compared with the chips in the examples 4 and 5.

The wear test was carried out under non-lubrication conditions. However, even in a wear test under lubrication conditions, substantially the tendency as in the wear test under the non-lubrication conditions was observed. Conditions for the wear test under lubrication were as follows: the material of the disk was an Al—10% by weight of Si alloy; the rotational speed of the disk was 5 m/sec.; the amount of oil supplied was 0.3 ml/min.; the load was 100N; the slide distance was 10 kin; and the area of the slide surface of the chip made from the slide surface construction was 1 cm². The wear amount was the same as described above.

The slide surface construction according to the present invention is provided on the slide member having the higher hardness. Several possible examples are given in Table 7.

TABLE 7

| Slide member of high hardness | Slide member of low hardness |
|---|---|
| Cylinder sleeve of gray cast iron | Piston of magnesium alloy |
| Cam shaft of gray cast iron | Bearing of aluminum alloy, magnesium alloy and the like |
| Crank shaft of steel, spheroidal graphite cast iron and the like | Bearing of aluminum alloy, copper alloy and the like |
| Shaft of gray cast iron, steel and the like | Oil seal of rubber |
| Pulley of steel, Fe-based sintered alloy, aluminum alloy, hard plastic and the like | Belt of rubber |
| Pressure plate of gray cast iron | Clutch facing of plastic |

What is claimed is:

1. A slide surface construction, which is formed of an aggregate of metal crystals having a body-centered cubic structure, said aggregate including (3hh0) oriented metal crystals with their (3hh0) planes (by Miller indices) oriented toward the slide surface, the content S of said (3hh0) oriented metal crystals being in a range represented by S≧40%.

2. A slide surface construction according to claim 1, wherein said metal crystals are Fe crystals, said (3hh0) plane being a {310} plane, and said slide surface being smoothed by the presence of the {310} oriented Fe crystals.

3. A slide surface construction according to claim 1 or 2, further comprising a mating member that has a hardness one half of that of said slide surface.

4. A slide surface construction according to claim 1 or 2, wherein an inclination with respect to a phantom plane along the slide surface forms an inclination angle Θ, and said inclination angle Θ of said (3hh0) plane is set in a range of 0°≦Θ≦15°.

* * * * *